(12) United States Patent
Tsujibayashi et al.

(10) Patent No.: US 7,137,663 B2
(45) Date of Patent: Nov. 21, 2006

(54) DETACHABLE SEAT FOR VEHICLE (75) Inventors: Toshiyuki Tsujibayashi, Tochigi (JP); Kiyoshi Yajima, Saitama (JP); Tamotsu Oishi, Saitama (JP); Koji Kamida, Saitama (JP)

(73) Assignees: TS Tech Co., Ltd., Saitama (JP); Honda Giken Kogyo Kabushiki Kaisha, Tokyo (JP)

( * ) Notice: Subject to any disclaimer, the term of this patent is extended or adjusted under 35 U.S.C. 154(b) by 54 days.

(21) Appl. No.: 10/845,827

(22) Filed: May 14, 2004

(65) Prior Publication Data
US 2004/0227386 A1 Nov. 18, 2004

(30) Foreign Application Priority Data
May 15, 2003 (JP) ............................. 2003-137917

(51) Int. Cl.
*B60N 2/32* (2006.01)
*B60N 2/02* (2006.01)

(52) U.S. Cl. ................... 297/15; 297/378.1; 296/65.03

(58) Field of Classification Search .................. 297/15, 297/378.1, 378.13, 378.11, 378.12; 296/65.05, 296/65.09, 65.03
See application file for complete search history.

(56) References Cited

U.S. PATENT DOCUMENTS

| | | | | |
|---|---|---|---|---|
| 2,799,321 A | * | 7/1957 | Liljengren et al. ............ 296/64 |
| 4,708,384 A | * | 11/1987 | LaRosa .................... 296/24.46 |
| 4,708,387 A | * | 11/1987 | Yamano et al. ............... 296/63 |
| 4,869,541 A | * | 9/1989 | Wainwright ............. 296/65.09 |
| 4,946,216 A | * | 8/1990 | Demick ....................... 296/63 |
| 5,871,255 A | * | 2/1999 | Harland et al. ............. 297/257 |
| 5,947,542 A | * | 9/1999 | Lux et al. ................ 296/65.03 |
| 6,012,755 A | * | 1/2000 | Hecht et al. ............. 296/65.03 |
| 6,039,401 A | * | 3/2000 | Rus ........................ 297/378.13 |
| 6,375,255 B1 | * | 4/2002 | Maruta et al. ................. 297/15 |

FOREIGN PATENT DOCUMENTS

| | | |
|---|---|---|
| JP | 2001301496 | 10/2001 |
| JP | 3356970 | 10/2002 |

* cited by examiner

*Primary Examiner*—Peter M. Cuomo
*Assistant Examiner*—Sarah B. McPartlin
(74) *Attorney, Agent, or Firm*—Dann, Dorfman, Herrell and Skillman, P.C.

(57) ABSTRACT

A detachable seat for a vehicle, includes a seat cushion, a seat leg mechanism for supporting the seat cushion, the seat leg mechanism including a base member on which the seat cushion is carried, and first and second spaced apart leg members pivotally connected to the base member, a seat back pivotally mounted to the base member of the seat leg mechanism, a first cooperating mechanism on the first and second leg members and a vehicle floor for causing the seat to be releasably locked with the vehicle floor, and a second cooperating mechanism on the base member and the seat cushion for causing the seat cushion to be removably or detachably mounted with respect to the base member.

9 Claims, 12 Drawing Sheets

DETACHABLE SEAT FOR VEHICLE

BACKGROUND OF THE INVENTION

1. Field of the Invention

This invention relates to a detachable seat for a vehicle, which facilitates obtaining of a space for any burdens and longitudinal articles and a walk-through space in the vehicle and, more particularly, to a detachable seat which is designed to be foldable or collapsible.

2. Description of the Related Art

Japanese Patent Application laid open under Provisionary Publication No. 2001-301496 discloses three seats for a vehicle, which are arranged side by side and designed in order to facilitate obtaining of a walk-through space in the vehicle. The seats comprise first and second seats, and a center seat arranged between the first and second seats. The center seat includes seat leg means slidably supported to a rail mechanism mounted to a vehicle floor and movable forward and rearward in the vehicle, and a seat cushion pivotally supported to a side of a seat cushion of one of the first and second seats so as to be vertically pivoted and adapted to be carried on the seat leg means and releasably secured with respect to the seat leg means during use of the center seat.

The seat leg means is provided with a striker. The seat cushion is provided with a striker lock. The seat cushion is releasably secured to the seat leg means by causing the striker lock of the seat cushion to be engaged with the striker of the seat leg means.

In the conventional center seat constructed as described above, when it is necessary to obtain a walk-through space in the vehicle, releasing of the seat cushion of the center seat from the seat leg means is carried out by causing the striker lock of the seat cushion to be disengaged from the striker of the seat leg means, whereby the seat cushion is released from the seat leg means. In a condition where the seat cushion of the center seat is released from the seat leg means and pivoted upward by a passenger's hand, when forward or rearward movement of the seat leg means is performed while causing the seat cushion to be released from the passenger's hand, the seat cushion of the center seat is pivoted downward by gravity. Thus, the seat cushion of the center seat is vertically accommodated in a space around the side of the seat cushion of the one of the first and second seats to which the seat cushion of the center seat is pivotally supported, whereby the walk-through space can be provided between the first and second seats. In this condition, the center seat is unavailable.

In the conventional center seat, the seat cushion of the center seat is vertically accommodated in the space around the side of the seat cushion of the one of the first and second seats, so that the walk-through space is provided between the first and second seats as discussed above. However, when the walk-through space is provided between the first and second seats, the seat leg means is located forward or rearward from the first and second seats, so that the seat leg means will interfere with widely utilizing of the space between the first and second seats as a storage space for any longitudinal articles, e.g. umbrellas, and a walk-through space.

Japanese Patent No. 3,356,970 discloses vehicle seats that are designed to be detachable from a vehicle floor in order to facilitate obtaining of a storage space for any longitudinal articles and a walk-through space in a vehicle. In the vehicle seats, there are problems of how each of the detached vehicle seats should be folded or collapsed into a single compact configuration after use of the vehicle seats, of how each of the detached vehicle seats should be easily returned to a usable condition when it is to be used, and of how each of the detached vehicle seats should be stably set on the vehicle floor when it is to be used.

SUMMARY OF THE INVENTION

The present invention has been made with a view to overcoming the foregoing problems of the prior art vehicle seats.

It is therefore an object of the present invention to provide a detachable seat for a vehicle, which can be easily folded or collapsed into a single compact configuration after use of the detachable seat, can be easily returned to a usable condition when it is to be used, and can be stably set on a vehicle floor when it is to be used.

It is another object of the present invention to provide a detachable seat for a vehicle, which can be easily detached and stored in a predetermined place in a compactly collapsed or folded condition.

It is still another object of the present invention to provide a detachable seat for a vehicle, which is simply constructed.

In accordance with the present invention, there is provided a detachable seat for a vehicle. The detachable seat comprises a seat cushion, seat leg means for supporting the seat cushion, the seat leg means comprising a base member on which the seat cushion is removably or detachably carried, and first and second spaced apart leg members pivotally connected to the base member so as to be collapsible laterally relative to the base member, a seat back pivotally mounted to the base member of the seat leg means, first cooperating means on the first and second leg members and a vehicle floor for causing an entire seat to be releasably locked with respect to the vehicle floor, and second cooperating means on the base member and the seat cushion for causing the seat cushion to be removably or detachably mounted with respect to the base member.

The first and second leg members are pivotally connected at upper ends thereof to the base member. The seat may further include linkage means for facilitating maintaining of the first and second leg members in standing-up conditions during use of the seat and facilitating laterally collapsing of the first and second leg members after the use of the seat.

The seat may further include first operating means for operating the linkage means, and second operating means for operating the first cooperating means to allow the seat to be released from the vehicle floor. The first and second operating means are provided at the base member so as to be exposed. The first and second operating means are adapted to be concealed by the seat cushion when the seat cushion is carried on the base member.

In a condition where the seat is detached from the vehicle floor and the seat cushion is removed from the base member of the seat leg means, one of the first and second leg members is adapted to be collapsible so as to be laid under the base member, the other of the first and second leg members is adapted to be collapsible so as to project laterally from the base member, the seat cushion is adapted to be carried on the other of the first and second leg members which has projected laterally, and the seat back is adapted to be overlapped on the base member of the seat leg means, whereby the seat is rendered to be a single compact configuration.

The base member of the seat leg means comprises a plate-shaped body having spaced apart rising sections rising from both sides of the plate-shaped body. The seat back has a width narrower than a space between the spaced apart rising sections of the base member, so that when the seat back is overlapped on the base member of the seat leg means, the seat back is received within the space between the spaced apart rising sections of the base member.

The seat further includes a height-adjustable headrest vertically movably supported on the seat back through a headrest stay. The headrest comprises a horizontally extending section and a front side section extending downward from the horizontally extending section for supporting the head of a passenger sitting on the seat. The front side section has a height enough to support the head of the passenger. When the headrest is moved downward relative to the seat back, the horizontally extending section of the headrest is abutted against an upper surface of the seat back and the front side section of the headrest becomes adjacent to a front surface of the seat back. When the seat back is overlapped on the base member of the seat leg means, the headrest is arranged around a front side of the base member of the seat leg means.

The seat cushion comprises a seat cushion body and a downward extending section extending downward from a front side of the seat cushion body. The seat cushion is adapted to be carried on the base member of the seat leg means with the downward extending section of the seat cushion being arranged around the front side of the base member of the seat leg means. In a condition where the seat back is overlapped on the base member of the seat leg means and the seat cushion is carried on the other of the first and second leg members which has been collapsed so as to project laterally from the base member of the seat leg means, the downward extending section of the seat cushion is adapted to be lined up with the headrest.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENT

A detachable seat for a vehicle according to an embodiment of the present invention will be discussed hereinafter with reference to the accompanying drawings.

Figure 1:
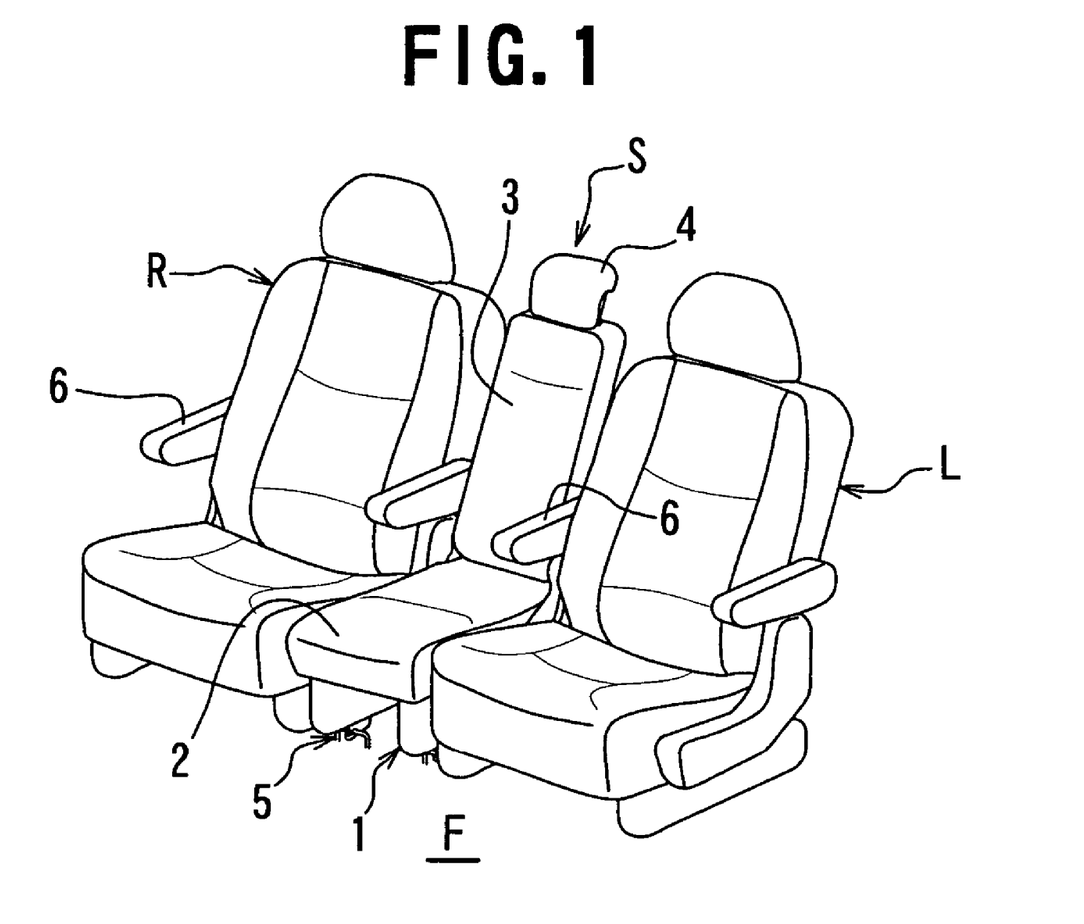
FIG. 1 is a schematic perspective view of three seats for a vehicle arranged side by side, in which the present application is applied to a center seat of the seats.

Referring to FIG. 1, there are illustrated three rear seats for a vehicle, which are arranged side by side on a vehicle floor F. In the illustrated example, the present invention is applied to a center seat S that is arranged between a first seat L and a second seat R. A width of the center seat S is narrower than that of each of the first and second seats L, R.

Figure 2:
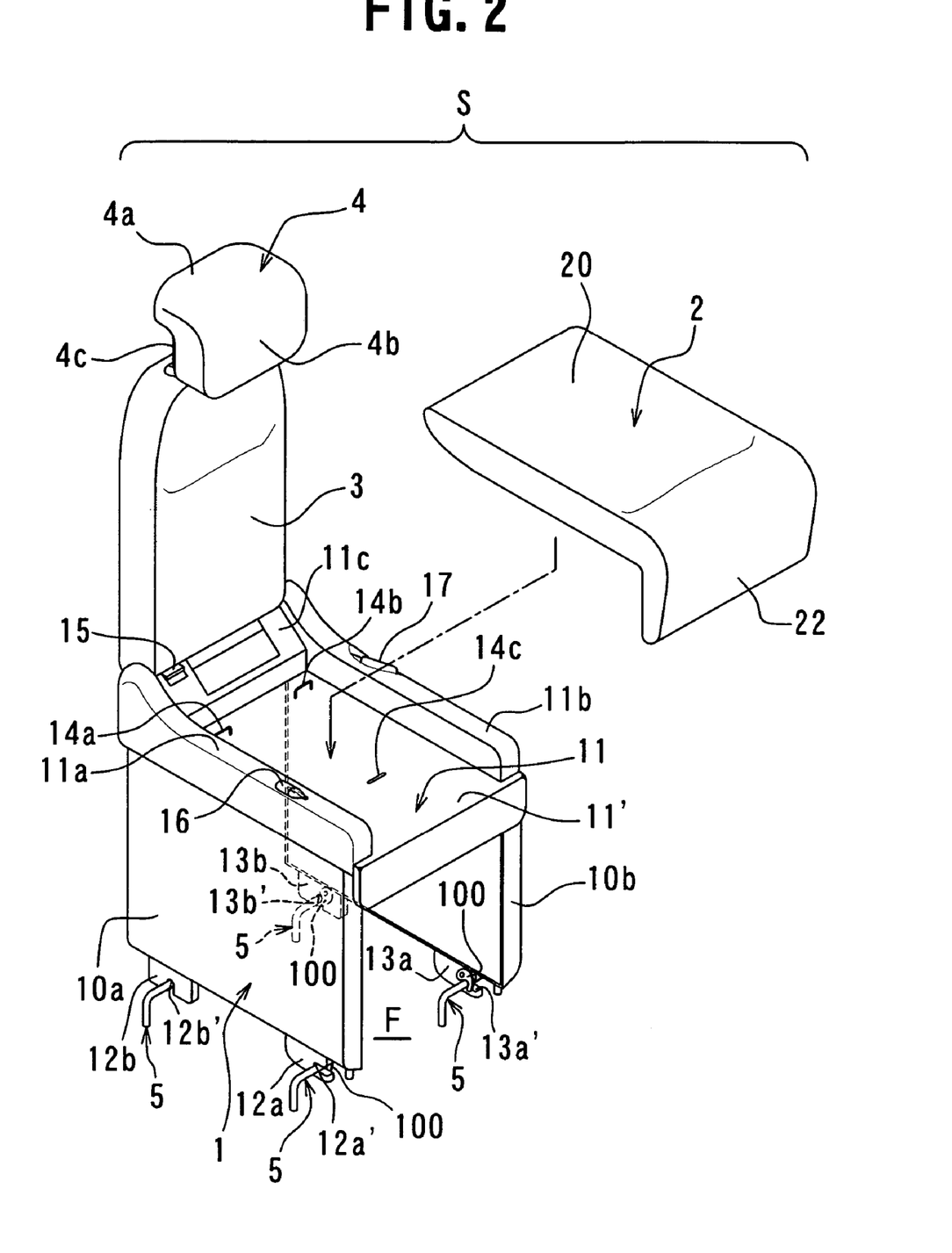
FIG. 2 is a schematic perspective view of the center seat of FIG. 1, in which a seat cushion for the center seat is removed from a base member of a seat leg means of the center seat.

Referring to FIG. 2, the center seat S comprises seat leg means 1 serving as a seat base means, the seat leg means 1 including first and second spaced apart leg members 10a, 10b and a base member 11 arranged on the first and second leg members 10a, 10b, a seat cushion 2 detachably or removably mounted to the base member 11 of the seat leg means 1, a seat back 3, a height-adjustable headrest 4, first cooperating means for causing the center seat S to be releasably locked with respect to the vehicle floor F, second cooperating means for causing the seat cushion 2 to be detachably or removably mounted with respect to the base member 11 of the seat leg means 1, and linkage means (not shown) for facilitating maintaining of the first and second leg members 10a, 10b in standing-up conditions during use of the center seat S and facilitating collapsing of the first and second leg members 10a, 10b after the use of the center seat S.

The base member 11 of the seat leg means 1 comprises a plate-shaped body 11', spaced apart rising sections 11a, 11b rising up from both sides of the plate-shaped body 11', and a housing section 11c provided at a rear end portion of the plate-shaped body 11' for housing a recliner device (not shown) for adjusting the angular position of the seat back 3 relative to the seat cushion 2 detachably mounted to the base member 11 of the seat leg means 1. The recliner device is housed within the housing section 11c. As the recliner device, there may be employed any suitable conventional recliner device.

The seat back 3 is pivotally mounted to the base member 11 of the seat leg means 1 through the recliner device. A width of the seat back 3 is narrower than a space between the rising sections 11a, 11b of the base member 11, so that when the seat back 3 is folded or collapsed relative to the base member 11 in a condition where the seat cushion 2 is removed from the base member 11, the seat back 3 can be received within the space between the rising sections 11a, 11b of the base member 11.

Figure 3:
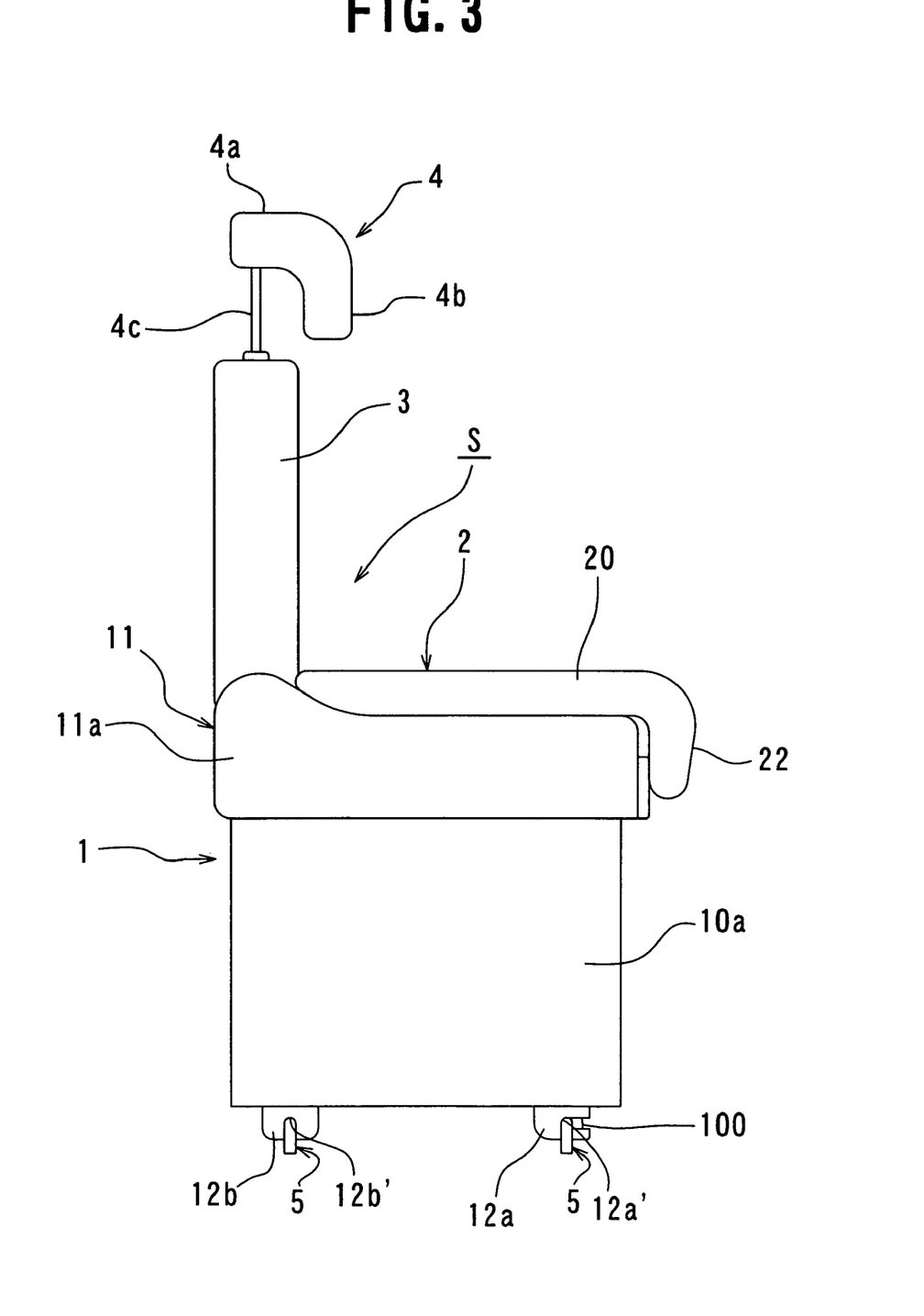
FIG. 3 is a schematic side view of the center seat.
Figure 4:
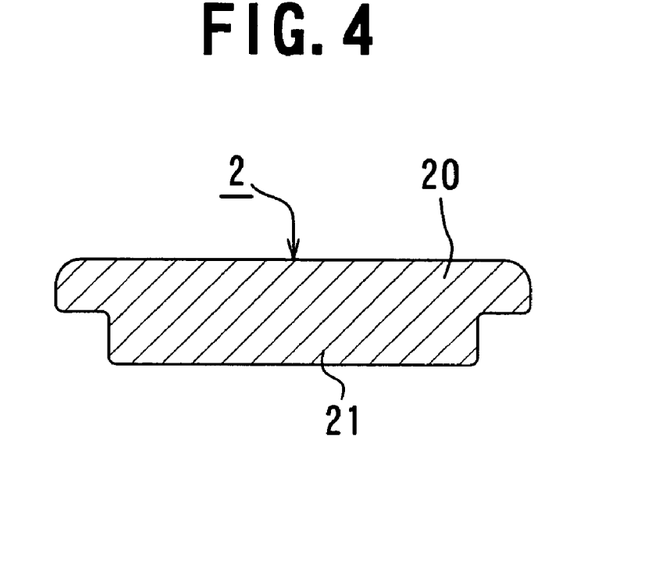
FIG. 4 is a schematic sectional view of the seat cushion of the center seat.
Figure 5:
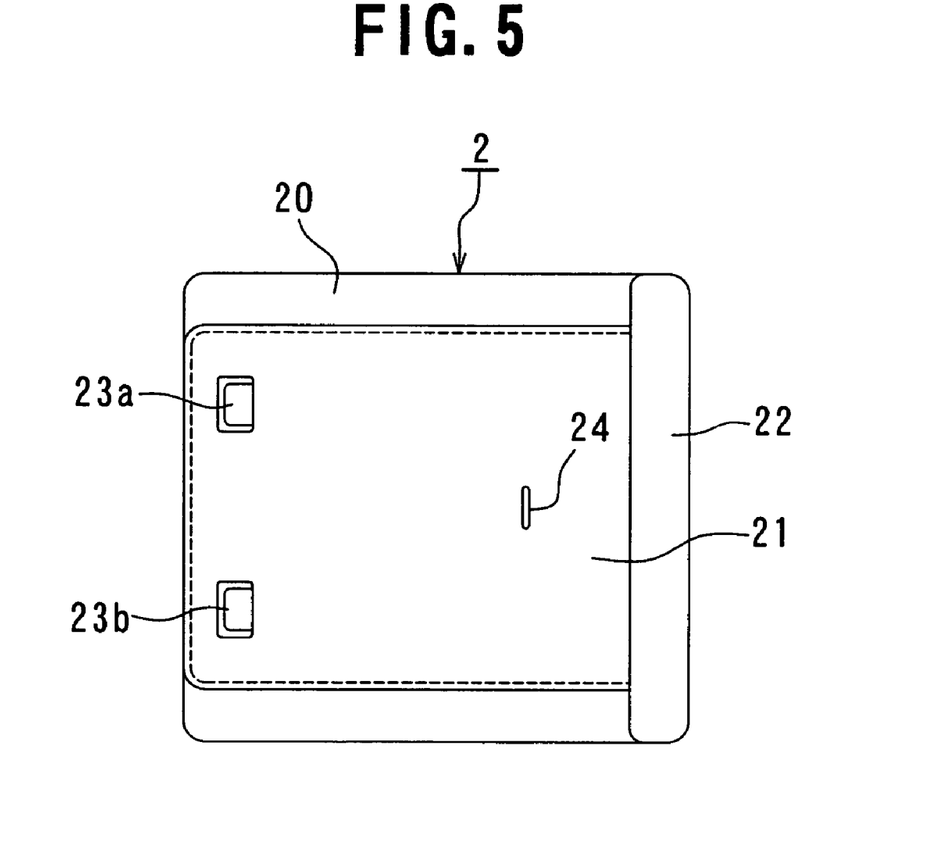
FIG. 5 is a schematic bottom view of the seat cushion of the center seat.

Referring to FIGS. 3–5, the seat cushion 2 comprises a seat cushion body 20, a downward extending section 22 (see FIGS. 3 and 5) extending downward from a front side of the seat cushion body 20, and a downward protruding section 21 (see FIGS. 4 and 5) protruding downward from a lower surface of the seat cushion body 20. A width of the downward protruding section 21 of the seat cushion body 20 is narrower than the space between the rising sections 11a, 11b of the base member 11. The seat cushion 2 is adapted to be carried on the base member 11 of the seat leg means 1 with the downward protruding section 21 thereof being received within the space between the rising sections 11a, 11b of the base member 11, with the seat cushion body 20 thereof being supported on the rising sections 11a, 11b of the base member 11, with the downward extending section 22 thereof being arranged around a front side portion of the base member 11, and with a rear section thereof covering the housing section 11c of the base member 11.

As shown in FIG. 3, the headrest 4 has a body of a substantially inverted L-shape in vertical section which comprises a horizontally extending section 4a and a front side section 4b extending downward from the horizontally extending section 4a. A headrest stay 4c hangs down from the horizontally extending section 4a of the headrest 4. The headrest stay 4c is slidably received in the seat back 3, so that a height of the headrest 4 is adapted to be adjusted by sliding of the headrest stay 4c. The head of a passenger sitting on the seat S can be rested on the front side section 4b of the headrest 4. The front side section 4b of the headrest 4 has a height enough to support the head of the passenger. When the headrest stay 4c is slid downward relative to the seat back 4, the horizontally extending section 4a of the headrest 4 is abutted against a top surface of the seat back 3 and the front side section 4b of the headrest 4 becomes adjacent to a front surface of the seat back 3.

Again referring to FIG. 2, the first cooperating means for causing the center seat S to be releasably locked with respect to the vehicle floor F comprises first and second striker locks 12a, 12b which are spaced apart from each other and attached to a lower end of the first leg member 10a, third and fourth striker locks 13a, 13b which are spaced apart from each other and attached to a lower end of the second leg member 10b, hook members 100 pivotally supported via pins (not shown) to inner sides of the striker locks 12a, 12b, 13a, 13b, and strikers 5 which correspond to the striker locks 12a, 12b, 13a, 13b in number and are attached to the vehicle floor F. In the illustrated example, the first and third striker locks 12a, 13a have horizontally extending openings 12a', 13a' formed therein, and the second and fourth striker locks 12b, 13b have vertically extending openings 12b', 13b' formed therein. Each of the strikers 5 is formed into a substantially U-shape in outline. Each of the U-shaped strikers 5 is attached at both ends thereof to the vehicle floor F with an opening thereof facing downward. The center seat S is releasably locked with respect to the vehicle floor F by causing the striker locks 12a, 12b, 13a, 13b to receive upper portions of corresponding strikers 5 through the openings 12a', 12b', 13a', 13b' of the striker locks 12a, 12b, 13a, 13b and causing the hook members 100 to be engaged with the upper portions of the corresponding strikers 5. Incidentally, the hook members 100 are always urged in such directions as to be engaged with the strikers 5, by coil springs (not shown) mounted on the unshown pins of the hook members 100. Further, the hook members 100 are coupled through wires (not shown) to a first operating lever for actuating the hook members 100, which will be discussed in greater detail hereinafter. When the first operating lever is operated, the hook members 100 are rotated against actions of the unshown coil springs, whereby the hook members 100 are disengaged from the strikers 5.

Figure 6:
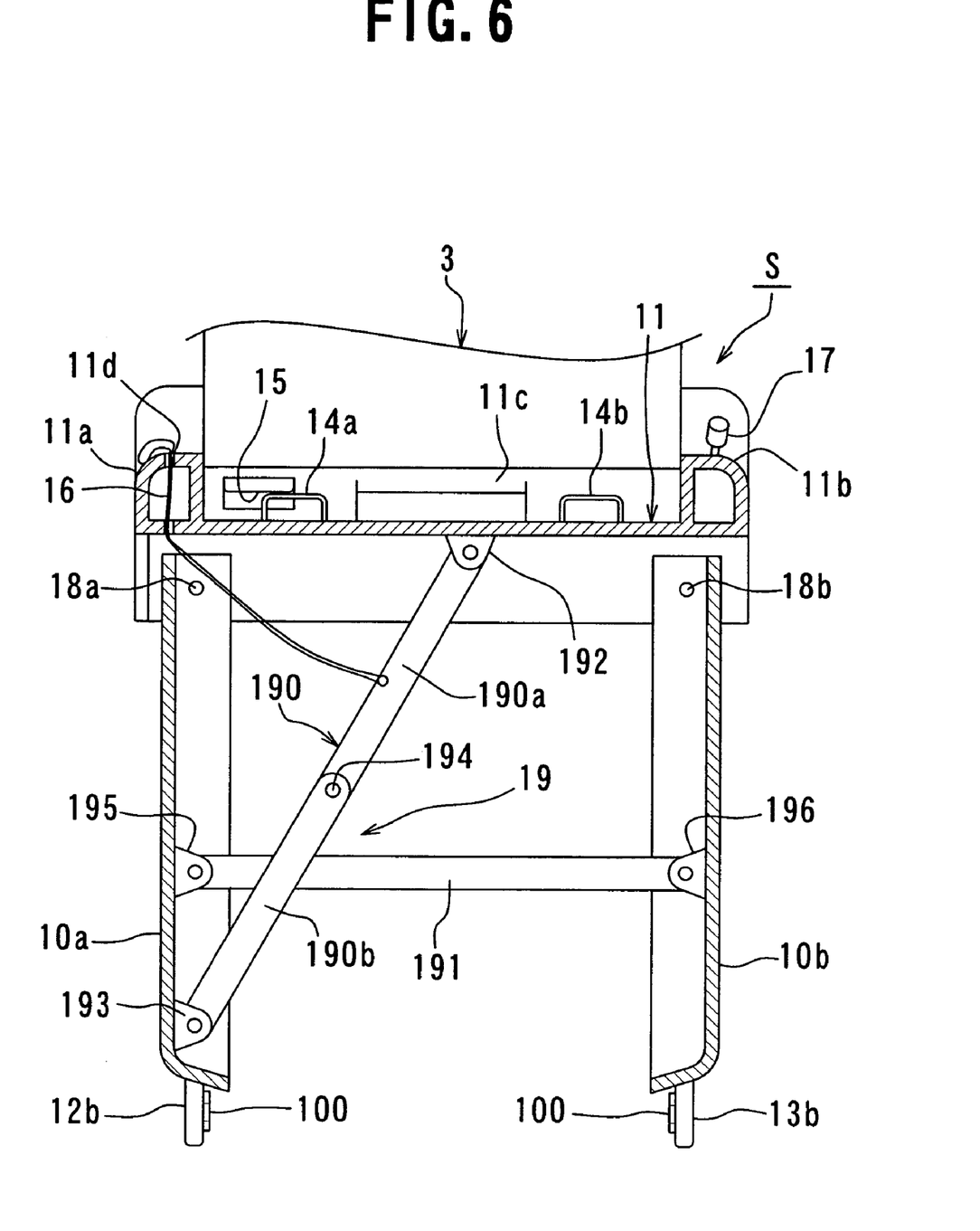
FIG. 6 is a schematic partially sectional front view of the center seat.

Again referring to FIGS. 2 and 5, and referring to FIG. 6, the second cooperating means for causing the seat cushion 2 to be detachably or removably mounted with respect to the base member 11 of the seat leg means 1 comprises engaging bars 14a, 14b of substantially U-shapes in outline (see FIGS. 2 and 6) which are spaced apart from each other and attached at both ends thereof onto an upper surface of the plate-shaped body 11' of the base member 11 with openings thereof facing downward, an engaging slit 14c (see FIG. 2) formed in the upper surface of the plate-shaped body 11' of the base member 11, spaced apart hooks 23a, 23b (see FIG. 5) provided on a bottom surface of the downward protruding section 21 of the seat cushion 2, and a plug-in member 24 of a substantially U-shape in outline (see FIG. 5) attached at both ends thereof onto the bottom surface of the downward protruding section 21 of the seat cushion 2 with an opening thereof facing downward. The seat cushion 2 is detachably mounted to the base member 11 of the seat leg means 1 with the hooks 23a, 23b thereof being engaged with the engaging bars 14a, 14b of the base member 11 and with the plug-in member 24 thereof being received in the engaging slit 14c of the base member 11.

As shown in FIG. 2, the first operating lever 15 for actuating the hook members 100 of the striker locks 12a, 12b, 13a, 13b, which is briefly discussed above, is provided at the housing section 11c of the base member 11. An operating strap 16 for operating the linkage means is coupled to the linkage means as will be discussed in greater detail hereinafter. An end portion of the operating strap 16 is led out of a top surface of one of the rising sections 11a, 11b of the base member 11 or the rising section 11a. A second operating lever 17 for actuating the recliner device is provided at the other of the rising sections 11a, 11b of the base member 11 or the rising section 11b. In a condition where the seat cushion 2 is carried on the base member 11 of the seat leg means 1, the operating strap 16 for operating the linkage means and the first operating lever 15 for actuating the hook members 100 of the striker locks 12a, 12b, 13a, 13b are adapted to be concealed by the seat cushion 2. When the seat cushion 2 is removed or detached from the base member 11, the operating strap 16 for operating the linkage means and the first operating lever 15 for actuating the hook members 100 of the striker locks 12a, 12b, 13a, 13b are exposed.

Again referring to FIG. 6, the first and second leg members 10a, 10b are pivotally connected at upper end portions thereof to a lower portion of the base member 11 by means of pins 18a, 18b. The first and second leg members 10a, 10b are adapted to be folded or collapsed laterally by the linkage means 19 that is briefly described above. The linkage means 19 serves as means to maintain the leg members 10a, 10b in standing-up conditions during the use of the center seat S, and means to allow the leg members 10a, 10b to be laterally folded or collapsed after the use of the center seat S.

The linkage means 19 comprises a first linkage member 190 bridged between the first leg member 10a and the base member 11 so as to obliquely extend, and a second linkage member 191 bridged between the first and second leg members 10a, 10b so as to horizontally extend. The first linkage member 190 of the linkage means 19 comprises an upper linkage bar 190a and a lower linkage bar 190b. The upper linkage bar 190a of the first linkage member 190 is pivotally connected at an upper end thereof to a bracket 192 that is provided at the base member 11. The lower linkage bar 190b of the first linkage member 190 is pivotally connected at a lower end thereof to a bracket 193 that is provided at a lower portion of the first leg member 10a. A lower end of the upper linkage bar 190a and an upper end of the lower linkage bar 190b are pivotally coupled to each other by a pin 194. The second linkage member 191 is pivotally connected at one end thereof to a bracket 195 that is provided at a substantially middle portion of the first leg member 10a, and is pivotally connected at the other end thereof to a bracket 196 that is provided at a substantially middle portion of the second leg member 10b.

The operating strap 16 for operating the linkage means 19 is coupled at a lower end thereof to the upper linkage bar 190a of the first linkage member 190. The upper end of the operating strap 16 is led out of the top surface of the rising section 11a of the base member 11 through a slit 11d that is formed in the top surface of the rising section 11a of the base member 11. When the operating strap 16 is pulled in a condition shown in FIG. 6, the first and second linkage bars 190a, 190b of the first linkage member 190 are operatively bent at the pin 194, whereby the first and second leg members 10a, 10b are laterally folded or collapsed.

Figure 7:
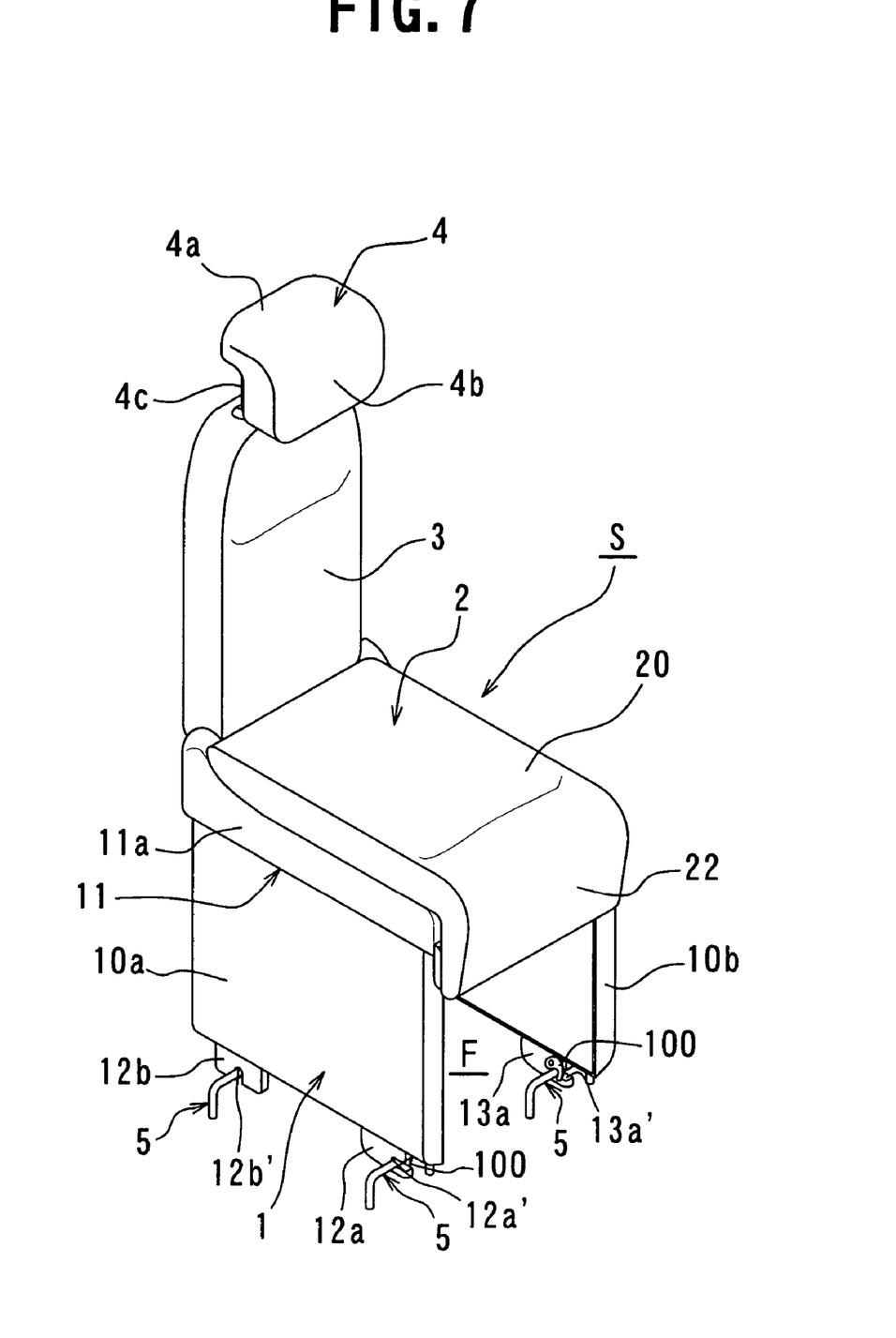
FIG. 7 is a schematic perspective view of the center seat, in which the seat cushion for the center seat is carried on the seat leg means.

Referring to FIG. 7, there is illustrated the complete center seat S constructed as described above. In the condition shown in FIG. 7, the center seat S is locked with respect to the vehicle floor F by means of the first cooperating means, the seat cushion 2 is removably secured to the base member 11 by means of the second cooperating means, and the first and second leg members 10a, 10b are maintained in the standing-up states by means of the linkage means 19 (FIG. 6). Therefore, the center seat S can be stably set on the vehicle floor F. In this condition, the passenger can sit on the center seat S. Further, the operating strap 16 for operating the linkage means 19, and the first operating lever 15 for actuating the hook members 100 of the striker locks 12a, 12b, 13a, 13b are covered or concealed by the seat cushion 2, so that there is no possibility that the passenger will accidentally touch the operating strap 16 and the first operating lever 15 so as to cause the linkage means 19 and the hook members 100 of the striker locks 12a, 12b, 13a, 13b to be actuated.

Incidentally, when arm rests 6 pivotally supported to the first and second seats L, R (see FIG. 1) are all pivoted upward, it is possible to provide a large space on the seats L, S, R, which is not defined by the arm rests 6.

In a case where the center seat S is to be detached from the vehicle floor in order to provide a walk-through space and/or a space for any burdens and longitudinal articles, first of all, the seat cushion 2 is detached from the base member 11 of the seat leg means 1. The detaching of the seat cushion 2 from the base member 11 of the seat leg means 1 is carried out by lifting up the seat cushion 2 while causing the plug-in member 24 to be drawn out from the slit 14c of the base member 11 of the seat leg means 1 and causing the hooks 23a, 23b of the seat cushion 2 to be disengaged from the engaging bars 14a, 14b of the base member 11. Thus, the seat cushion 2 can be easily detached from the base member 11 of the seat leg means 1.

When the seat cushion 2 is removed from the base member 11 of the seat leg means 1, the operating strap 16 for operating the linkage means 19 and the first operating lever 15 for actuating the hook members 100 of the striker locks 12a, 12b, 13a, 13b are exposed as discussed above. In this condition, when the first operating lever 15 for actuating the hook members 100 of the striker locks 12a, 12b, 13a, 13b is pulled up, the hook members 100 of the striker locks 12a, 12b, 13a, 13b are rotated so as to release the strikers 5 therefrom. Thus, the center seat S is brought into a condition where it is detachable from the vehicle floor. In this condition, the center seat S can be detached from the vehicle floor by lifting up the center seat S while still pulling up the first operating lever 15 and causing the receiving holes 12a', 12b', 13a', 13b' of the striker locks 12a, 12b, 13a, 13b to be released from the strikers 5.

Figure 8:
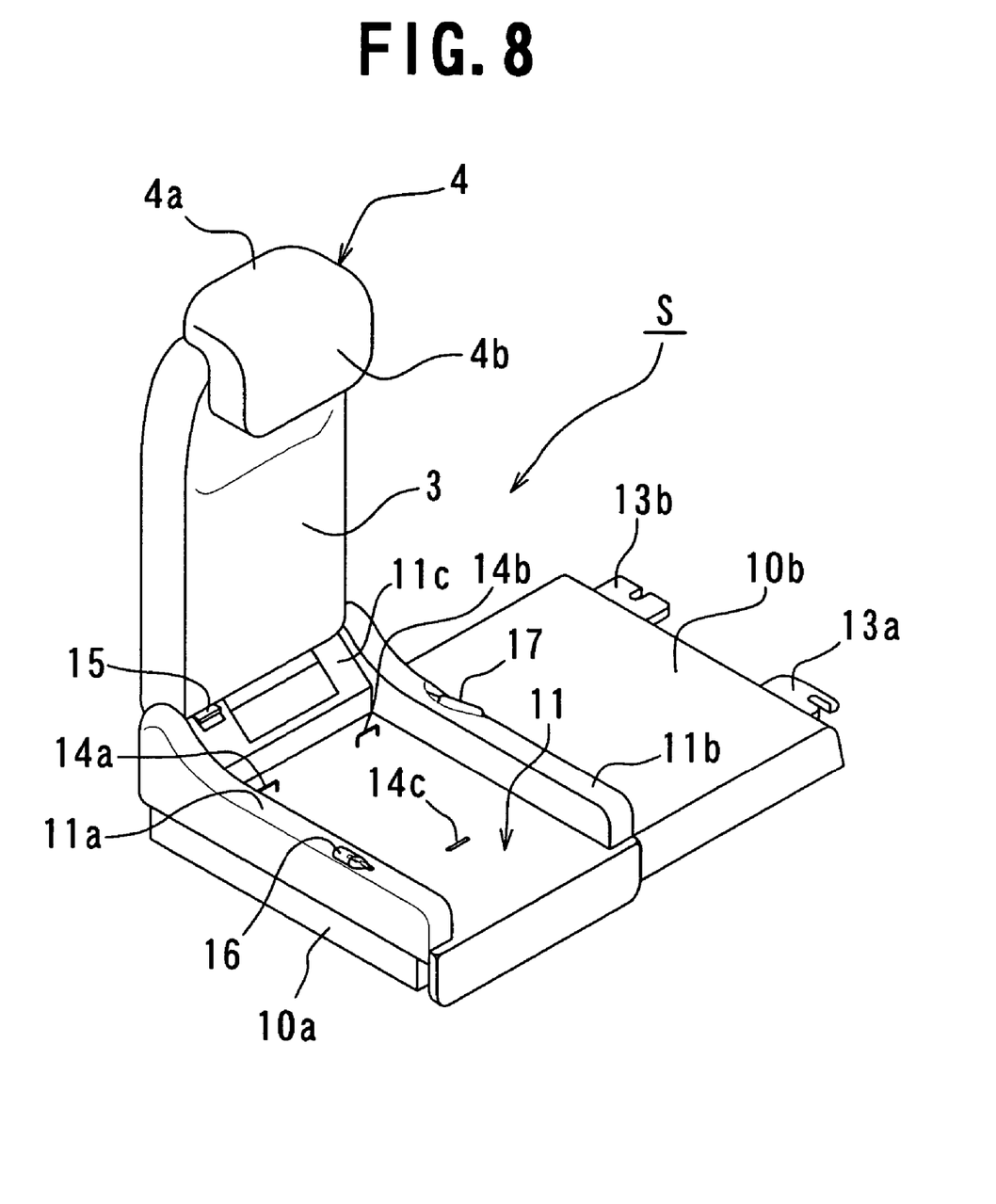
FIG. 8 is a schematic perspective view of the center seat, in which the seat cushion of the center seat is removed from the base member of the seat leg means and first and second leg members of the seat leg means of the center seat are collapsed or folded.
Figure 9:
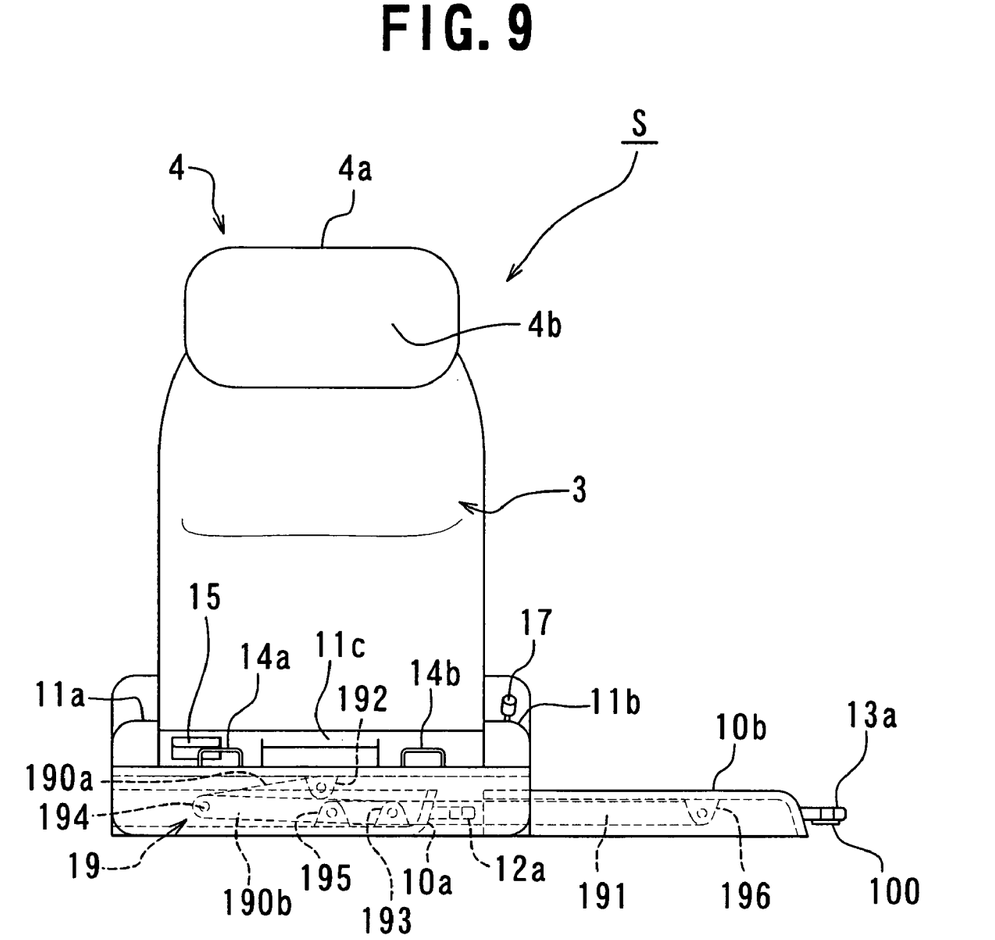
FIG. 9 is a schematic front view of the center seat shown in FIG. 8.

In the condition where the center seat S is detached from the vehicle floor, when the operating strap 16 is pulled, the upper and lower linkage bars 190a, 190b of the first linkage member 190 are operatively bent at the pin 194, whereby the leg members 10a, 10b of the seat leg means 1 are collapsed laterally or fall sideways as shown in FIG. 8. In this condition, one 10a of the leg members 10a, 10b is laid under the base member 11 and the other 10b of the leg members 10a, 10b is projected laterally from the base member 11. More particularly, the linkage means is in place under the base member 11 with the upper and lower linkage bars 190a, 190b of the first linkage member 190 being bent at the pin 194, and with the second linkage member 191 lining up with the bent first linkage member 190 as shown in FIG. 9.

Figure 10:
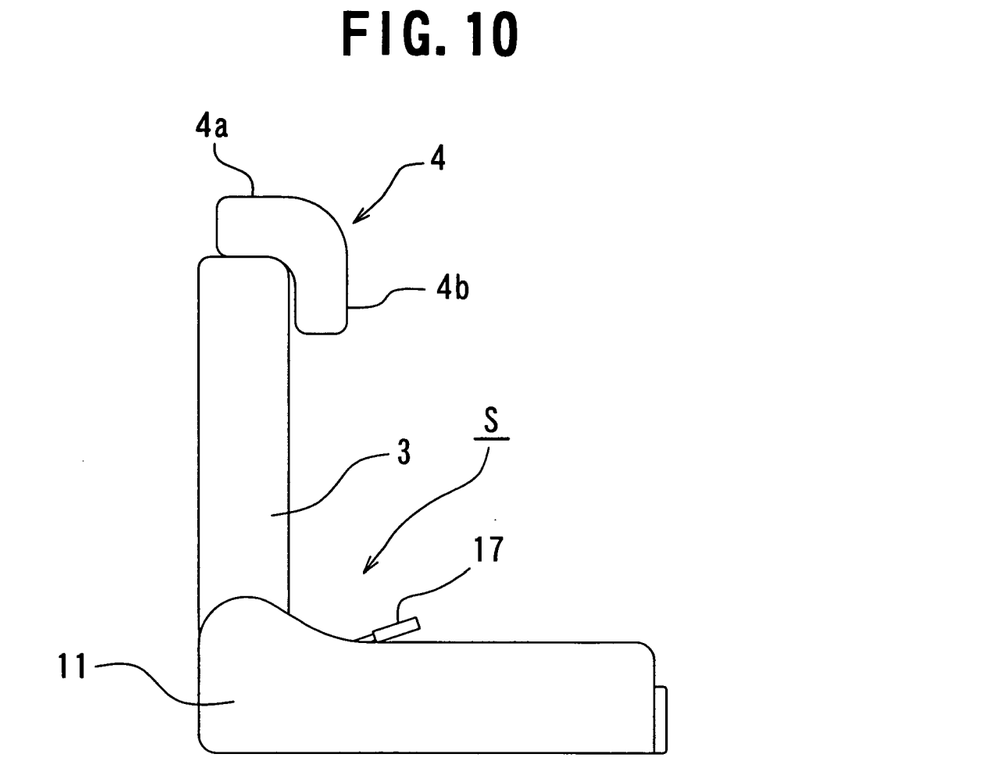
FIG. 10 is a schematic side view of the center seat shown in FIG. 8.

In the condition where the leg members 10a, 10b of the seat leg means 1 are collapsed, moving of the headrest 4 downward is carried out, whereby the front side section 4b of the headrest 4 becomes adjacent to the front surface of the seat back 3 and the horizontally extending section 4a of the headrest 4 is abutted against the top surface of the seat back 3 as shown in FIG. 10. In this condition, when the second operating lever 17 for actuating the recliner device is pulled upward, the seat back 3 is pivotally moved forward and overlapped on the base member 11 as shown in FIG. 11.

Figure 11:
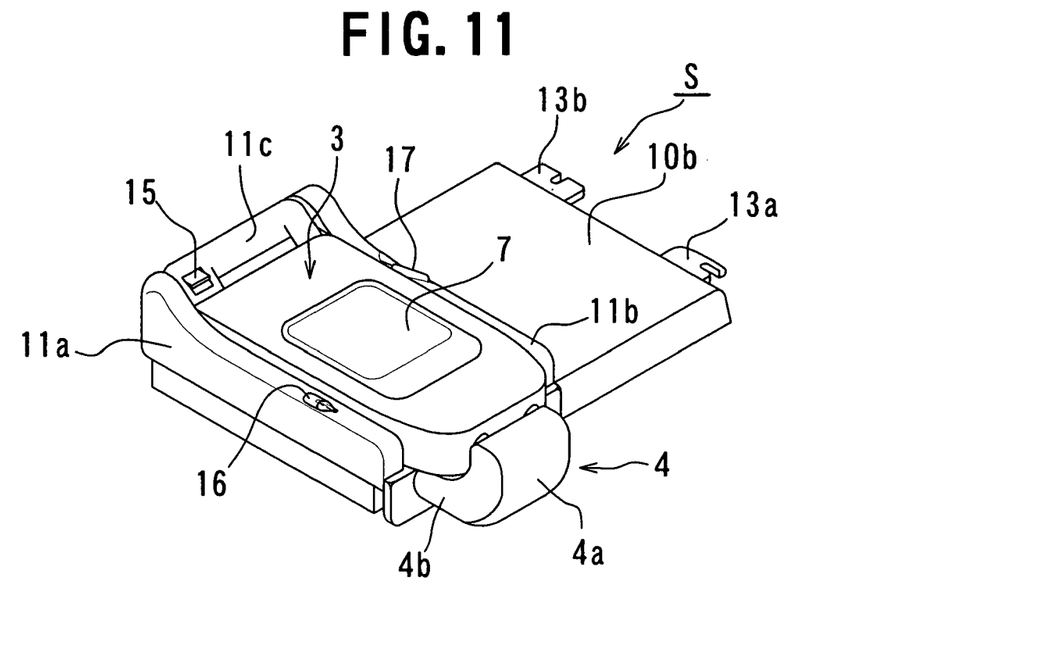
FIG. 11 is a schematic perspective view of the center seat shown in FIG. 8, in which a seat back of the center seat is collapsed and overlapped on the base member of the seat leg means.
Figure 12:
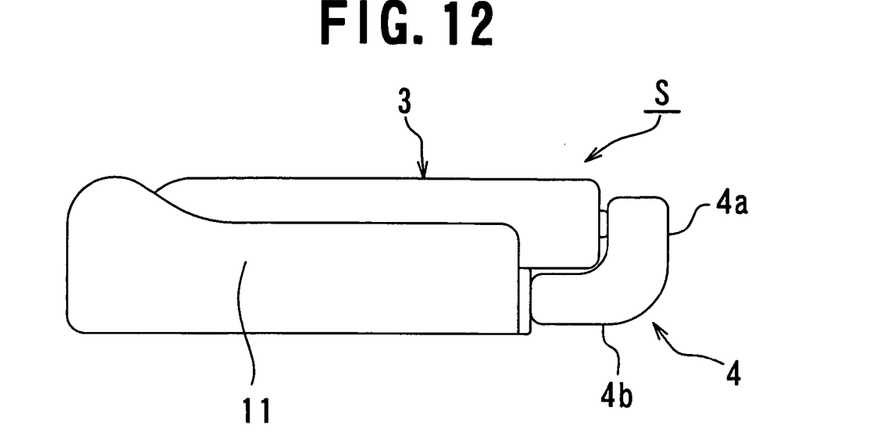
FIG. 12 is a schematic side view of the center seat shown in FIG. 11.

In the state where the seat back 3 is overlapped on the base member 11 as shown in FIG. 11, the seat back 3 is received within the space between the rising sections 11a, 11b of the base member 11, and the headrest 4 is arranged around the front side of the base member 11 as shown in FIG. 12.

Figure 13:
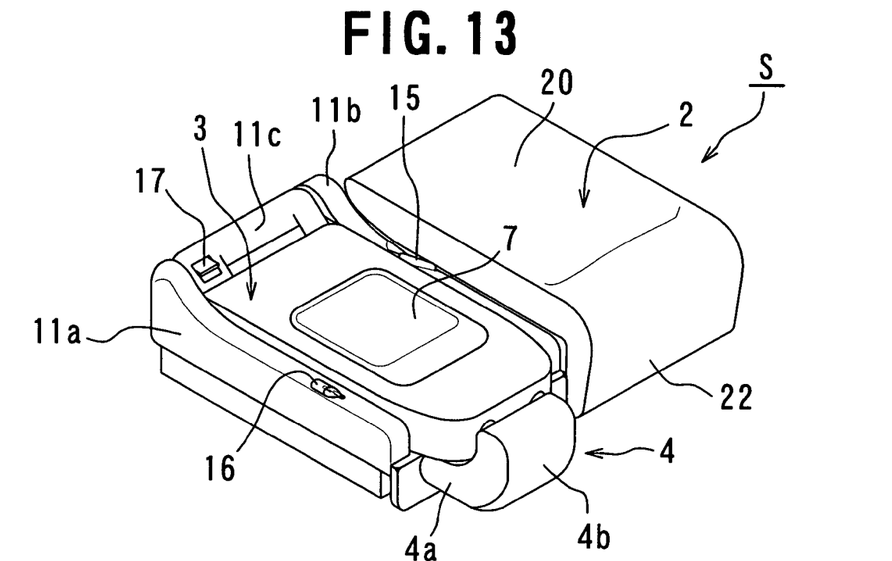
FIG. 13 is a schematic perspective view of the center seat shown in FIG. 11, in which the seat cushion for the center seat is carried on one of the first and second leg members of the seat leg means which has been collapsed and projected laterally.

In the condition shown in FIG. 12, the seat cushion 2 is carried on the second leg member 10b having projected laterally from the base member 11, with the downward extending section 22 thereof being arranged around one side of the second leg member 10b as shown in FIG. 13. Thus, the central seat S is rendered to be a single compact configuration.

Figure 14:
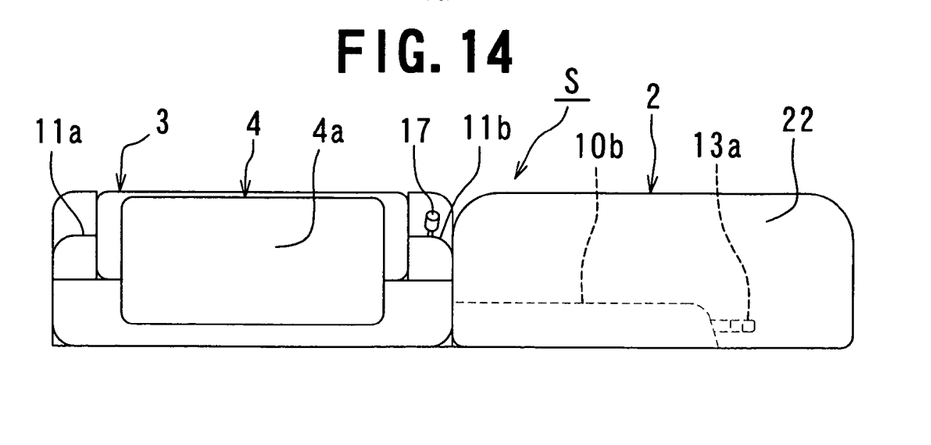
FIG. 14 is a schematic front view of the center seat shown in FIG. 13.

In the center seat which is in the compactly collapsed and arranged condition, the seat cushion 2 and the seat back 3 are arranged side by side as shown in FIG. 14, and the downward extending section 22 of the seat cushion 2 and the headrest 4 of the seat back 3 are arranged side by side. Therefore, the compactly collapsed and arranged center seat S can be easily carried and used as means on which any burdens are to be put. As shown in FIGS. 11 and 13, a tray 7 may be provided in a rear side of the seat back 3. The tray 7 can be used as table means on which any small-sized articles are to be put.

Figure 15:
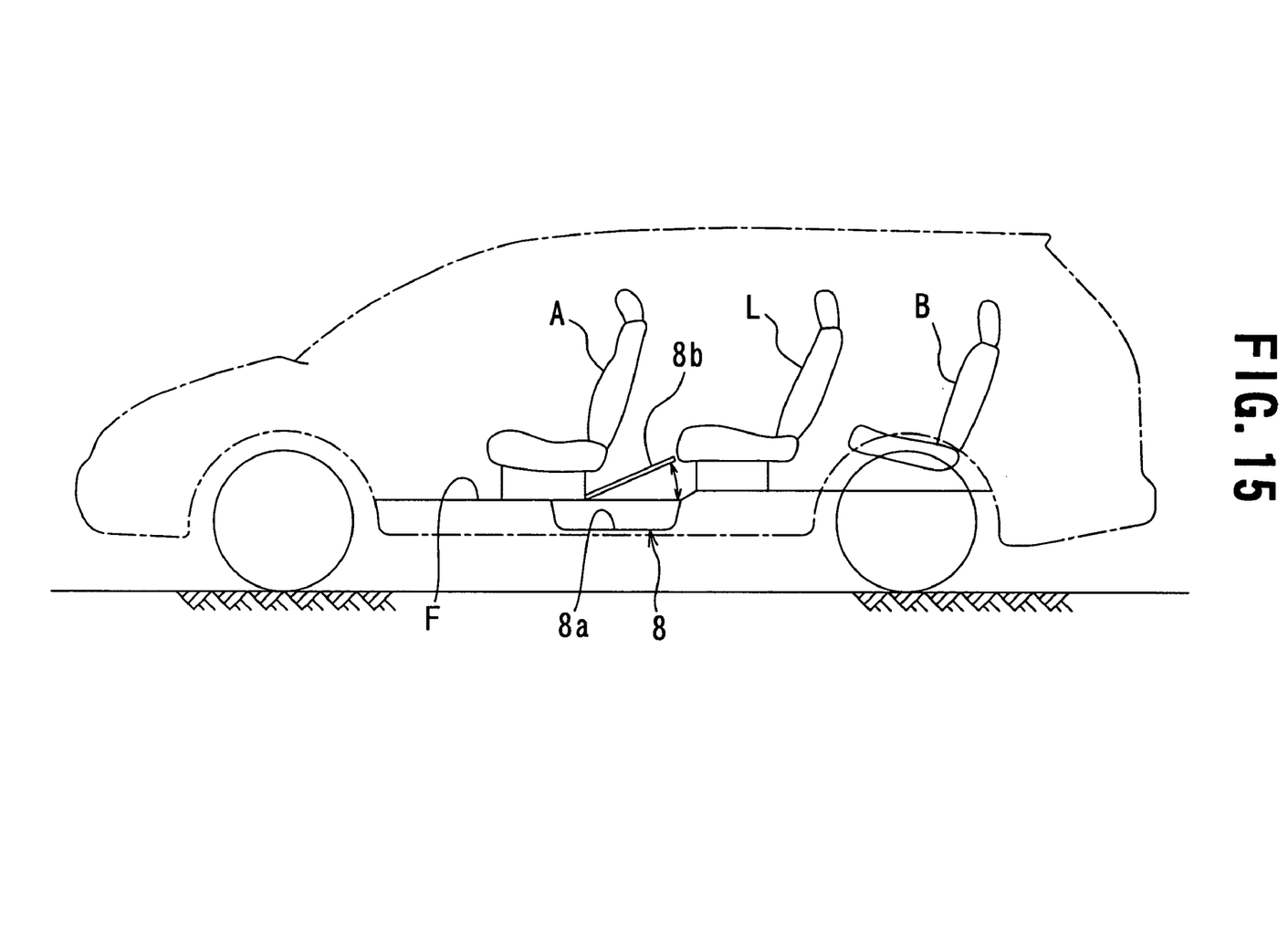
FIG. 15 is a schematic side view of a vehicle and of assistance in explaining a storage means for storing a compactly collapsed and arranged center seat.
Figure 16:
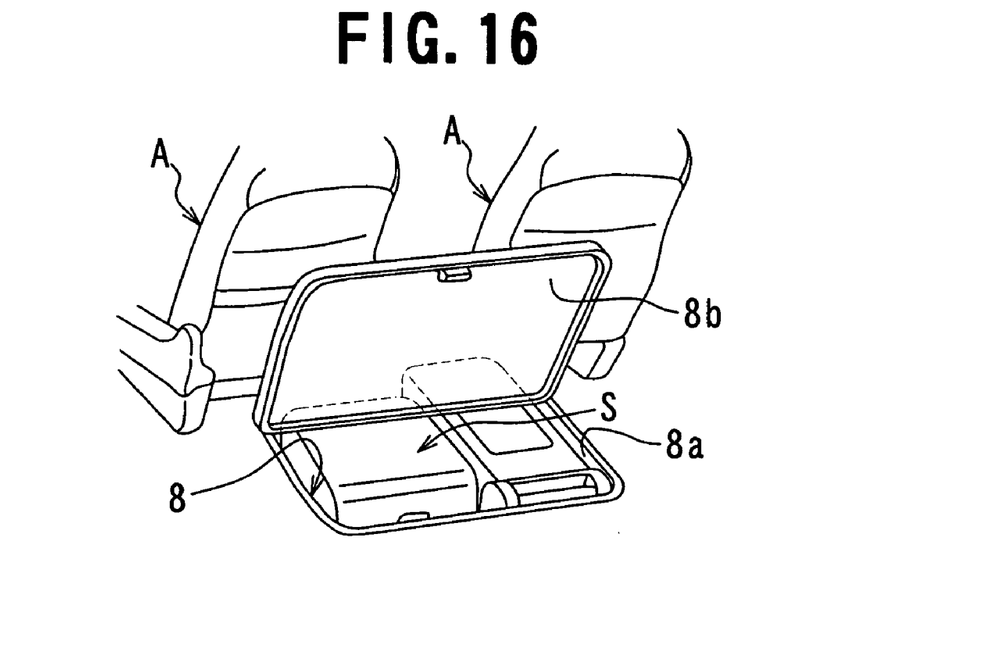
FIG. 16 is a schematic perspective view of the storage means shown in FIG. 15.

Referring to FIGS. 15 and 16, there may be provided storage means 8 for storing the compactly collapsed and arranged center seat S. The storage means 8 is provided in a portion of the vehicle floor between front seats A and the rear seats L, R (see FIG. 1). The storage means 8 comprises a trunk room 8a provided in the portion of the vehicle floor between the front seats A and the rear seats L, R, and a lid member 8b openably hinged to the trunk room 8a. The compactly collapsed and arranged center seat S can be housed within the trunk room 8a.

Figure 17:
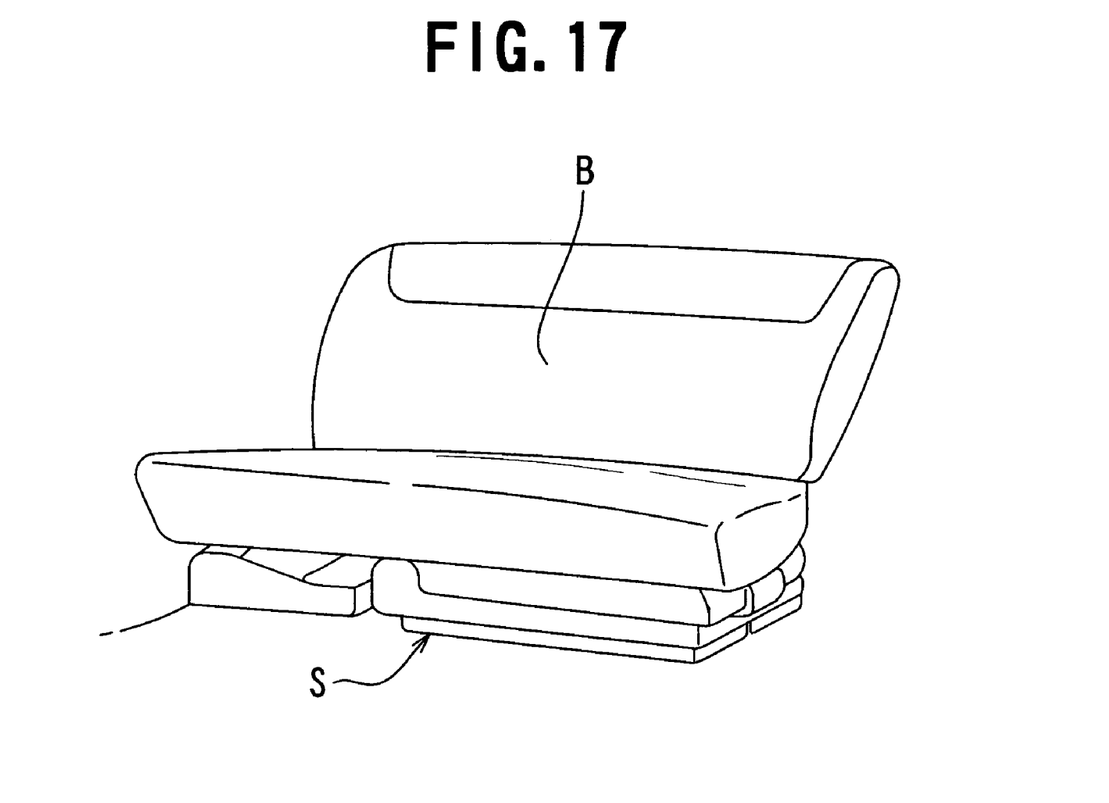
FIG. 17 is a schematic perspective view of a bench seat and of assistance in explaining a space for storing the compactly collapsed and arranged center seat.

Again referring to FIG. 15 and referring to FIG. 17, a space under a bench seat B arranged behind the rear seats L, R can be used as a storage space for the compactly collapsed and arranged center seat S.

While the embodiment of the present invention has been described in connection with a center seat, the present invention may be applied to any vehicle seat other than such a center seat as discussed above.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A detachable seat for a vehicle, comprising:
   a seat cushion;
   seat leg means for supporting said seat cushion;
   said seat leg means comprising a base member on which said seat cushion is removably or detachably carried, and first and second spaced apart leg members pivotally connected at upper ends thereof to said base member so as to be collapsible laterally relative to said base member;
   a seat back pivotally mounted to said base member of said seat leg means;
   first cooperating means on said first and second leg members and a vehicle floor for causing the entire seat to be releasably locked with respect to said vehicle floor;
   second cooperating means on said base member and said seat cushion for causing said seat cushion to be removably or detachably mounted with respect to said base member;
   linkage means for facilitating maintaining of said first and second lea members in standing-up conditions during use of said seat and facilitating laterally collapsing of said first and second leg members after the use of said seat;
   first operating means for operating said linkage means; and
   second operating means for operating said first cooperating means to allow said seat to be released from said vehicle floor;
   said first and second operating means being provided at said base member so as to be exposed; and
   said first and second operating means being adapted to be concealed by said seat cushion when said seat cushion is carried on said base member.

2. A detachable seat for a vehicle according to claim 1, wherein in a condition where said seat is detached from said vehicle floor and said seat cushion is removed from said base member of said seat leg means, one of said first and second leg members is adapted to be collapsible so as to be laid under said base member, the other of said first and second leg members is adapted to be collapsible so as to project laterally from said base member, said seat cushion is adapted to be carried on the other of said first and second leg members which has projected laterally, and said seat back is adapted to be overlapped on said base member of said seat leg means, whereby said seat is rendered to be a single compact configuration.

3. A detachable seat for a vehicle according to claim 2, wherein said base member of said seat leg means comprises a plate-shaped body having spaced apart rising sections rising from both sides of said plate-shaped body, and wherein said seat back has a width narrower than a space between said spaced apart rising sections of said base member, so that when said seat back is overlapped on said base member of said seat leg means, said seat back is received within said space between said spaced apart rising sections of said base member.

4. A detachable seat for a vehicle according to claim 3, further including a height-adjustable headrest vertically movably supported on said seat back through a headrest stay, said headrest comprising a horizontally extending section and a front side section extending downward from said horizontally extending section for supporting the head of a passenger sitting on said seat, said front side section having a height enough to support the head of the passenger, wherein when said headrest is moved downward relative to said seat back, said horizontally extending section of said headrest is abutted against an upper surface of said seat back and said front side section of said headrest becomes adjacent to a front surface of said seat back, and wherein when said seat back is overlapped on said base member of said seat leg means, said headrest is arranged around a front side of said base member of said seat leg means.

5. A detachable seat for a vehicle according to claim 4, wherein said seat cushion comprises a seat cushion body and a downward extending section extending downward from a front side of said seat cushion body, said seat cushion being adapted to be carried on said base member of said seat leg means with said downward extending section of said seat cushion being arranged around said front side of said base member of said seat leg means, and in a condition where said seat back is overlapped on said base member of said seat leg means and said seat cushion is carried on the other of said first and second leg members which has been collapsed so as to project laterally from said base member of said seat leg means, said downward extending section of said seat cushion is adapted to be lined up with said headrest.

6. A detachable seat for a vehicle comprising:
   a seat cushion;
   seat leg means for supporting said seat cushion;
   said seat leg means comprising a base member on which said seat cushion is removably or detachably carried, and first and second spaced apart leg members pivotally connected to said base member so as to be collapsible laterally relative to said base member;
   a seat back pivotally mounted to said base member of said seat leg means;
   first cooperating means on said first and second leg members and a vehicle floor for causing the entire seat to be releasably locked with respect to said vehicle floor; and
   second cooperating means on said base member and said seat cushion for causing said seat cushion to be removably or detachably mounted with respect to said base member,
   wherein in a condition where said seat is detached from said vehicle floor and said seat cushion is removed from said base member of said seat leg means, one of said first and second leg members is adapted to be collapsible so as to be laid under said base member, the other of said first and second leg members is adapted to be collapsible so as to project laterally from said base member, said seat cushion is adapted to be carried on the other of said first and second leg members which has projected laterally, and said seat back is adapted to be overlapped on said base member of said seat leg means, whereby said seat is rendered to be a single compact configuration.

7. A detachable seat for a vehicle according to claim 6, wherein said base member of said seat leg means comprises a plate-shaped body having spaced apart rising sections rising from both sides of said plate-shaped body, and wherein said seat back has a width narrower than a space between said spaced apart rising sections of said base member, so that when said seat back is overlapped on said base member of said seat leg means, said seat back is received within said space between said spaced apart rising sections of said base member.

8. A detachable seat for a vehicle according to claim 7, further including a height-adjustable headrest vertically movably supported on said seat back through a headrest stay, said headrest comprising a horizontally extending section and a front side section extending downward from said horizontally extending section for supporting the head of a passenger sitting on said seat, said front side section having a height enough to support the head of the passenger, wherein when said headrest is moved downward relative to said seat back, said horizontally extending section of said headrest is abutted against an upper surface of said seat back and said front side section of said headrest becomes adjacent to a front surface of said seat back, and wherein when said seat back is overlapped on said base member of said seat leg means, said headrest is arranged around a front side of said base member of said seat leg means.

9. A detachable seat for a vehicle according to claim 8, wherein said seat cushion comprises a seat cushion body and a downward extending section extending downward from a front side of said seat cushion body, said seat cushion being adapted to be carried on said base member of said seat leg means with said downward extending section of said seat cushion being arranged around said front side of said base member of said seat leg means, and wherein in a condition where said seat back is overlapped on said base member of said seat leg means and said seat cushion is carried on the other of said first and second leg members which has been collapsed so as to project laterally from said base member of said seat leg means, said downward extending section of said seat cushion is adapted to be lined up with said headrest.

* * * * *